United States Patent [19]

Franklin et al.

[11] 3,932,560

[45] Jan. 13, 1976

[54] HIGH-MOLECULAR WEIGHT ACIDIC POLYMERS

[75] Inventors: William E. Franklin; Stanley P. Rowland, both of New Orleans, La.

[73] Assignee: The United States of America as represented by the Secretary of Agriculture, Washington, D.C.

[22] Filed: Aug. 28, 1974

[21] Appl. No.: 501,416

[52] U.S. Cl............ 260/851; 260/29.6 H; 260/80 R
[51] Int. Cl.$^2$....................................... C08F 120/06
[58] Field of Search............... 260/80 R, 80 C, 851

[56] References Cited
UNITED STATES PATENTS

| 3,030,319 | 4/1962 | Kaizerman et al. | 260/80 C |
| 3,037,004 | 5/1962 | Simone et al. | 260/80 C |
| 3,301,838 | 1/1967 | Heiba | 260/80 C |

OTHER PUBLICATIONS
Neurath, "The Proteins" Vol. III, 1965, Second Ed. Academic Press pp. 27 & 78.
Alexander "Analytical Methods of Protein Chem." Vol. I, Pergamon Press, 1960, pp. 104 & 105.

*Primary Examiner*—Murray Tillman
*Assistant Examiner*—A. H. Koeckert
*Attorney, Agent, or Firm*—M. Howard Silverstein; Max D. Hensley

[57] ABSTRACT

Acidic monomers are polymerized in aqueous solutions containing a free radical initiating catalyst and a methylol amide reagent or formaldehyde. The resulting acidic polymers have very high molecular weight as measured by the viscosities of dilute solutions of the acidic and neutralized polymers. The reaction solutions can be used to form tough, insoluble films, and the polymers can serve as effective thickening agents and flocculating agents.

2 Claims, No Drawings

HIGH-MOLECULAR WEIGHT ACIDIC POLYMERS

FIELD OF THE INVENTION

This invention relates to high molecular weight polymers of acrylic acid and other water-soluble acidic monomers. Specifically, this invention relates to a process for making water soluble, acidic polymers and solutions of these polymers having very high viscosities. This invention constitutes a process whereby water-soluble acidic monomers can be converted to solutions of effective thickening agents or into tough insoluble films.

BACKGROUND AND PRIOR ART

The preparation of water-soluble, acidic polymers is generally carried out either by the modification of neutral polymers to introduce acidic groups onto the polymer chain or by solution polymerization of acidic monomers. Modifications of neutral polymers, for example, hydrolysis of polyacrylamide or carboxymethylation of cellulose, are generally difficult and costly processes, and often lead to the degradation of the polymer with resulting lowering of the molecular weights of the modified polymers. The solution phase polymerization of acidic monomers, such as acrylic acid, is an efficient and economical reaction, but generally results in polymers of only moderately high molecular weights, which are not effective thickeners or floculating agents.

The solution phase polymerization of acidic monomers is generally caried out by adding a free radical initiating catalyst to a solution of an appropriate concentration of the monomer. Since the acidic polymers are generally used in aqueous solutions, e.g., as floculating agents, the solvent in these polymerizations is usually water. The water solvent also helps to control the exothermic nature of the reaction. The initiating catalysts are chemicals or combinations of chemicals which generate free radicals during the course of the reaction. When normal precautions are taken, such as exclusion of air and the use of low catalyst to monomer ratios in these reactions, the resulting polymers have only moderately high molecular weights i.e., up to several hundred thousand.

When acidic polymers of very high molecular weights are desired for applications such as thickening agents and floculating agents, the usual practice is to modify very high molecular weight natural or synthetic polymers so as to form acidic groups along the already formed polymer chain. An example of such a practice is in the preparation of very high molecular weight polyacrylic acid, where acrylamide is polymerized to a molecular weight of several million and then subsequently hydrolyzed with acid or base to convert the amide groups to carboxylic acid groups. This practice is inefficient and costly and is only used because it is not possible to polymerize acrylic acid directly to such high molecular weights.

OBJECTS OF THE INVENTION

The primary object of this invention is to provide improved processes for preparing very high molecular weight, water-soluble acidic polymers. Another object of this invention is to provide modifications in the art of polymerizing acrylic acid and other water-soluble acidic monomers which will permit the economical and facile preparations of very high molecular weight polymers directly from the monomers. Yet another object of this invention is to provide simplified and economical methods of producing highly effective thickening agents, floculating agents, and solutions of acidic polymers which can be converted into tough, resilient films which are resistant to solution in water and organic solvents.

SUMMARY OF THE INVENTION

We have discovered that the addition of methylolamide reagents or formaldehyde to reaction mixtures of aqueous solution phase, free-radical polymerizations of acidic monomers results in a large increase in the viscosity of the resulting polymer solutions, and thus in a large increase in the apparent molecular weight of the polymers produced by these reactions. This high viscosity is obtained only when the methylol reagent is present during the course of the polymerization reaction, since the addition of the methylol reagents to solutions of polymers from the same monomers, with or without added catalyst, produces no significant changes in the viscosity of these polymer solutions, even after long periods of standing. The high viscosity of solutions of the polymers formed in the presence of the methylol reagents must be a result of the high molecular weights of these polymers, since the difference in viscosity remains as solutions of the polymers formed in the presence and in the absence of the methylol reagents are diluted to low concentrations in order to make measurements of the viscosities of the polymer solutions. In addition, films made from solutions of the polymers formed in the presence of the methylol reagents are tougher and more resistant to solutions in water or aqueous alkali than are films made similarly from polymers of the same monomers formed in the absence of the methylol reagents, even if equivalent amounts of the methylol reagents are added to these polymer solutions before they are formed into films. This effect of the methylol reagents on the free radical polymerization reaction is unexpected and there is no ready explanation for the effect. Isolation of the products of the reaction shows that the polymerizations both in the presence and in the absence of the methylol reagents are 95 to 100% complete. Thus the higher viscosity of the solutions polymerized in the presence of the methylol reagents is not a result of a higher conversion of monomer catalyzed by the methylol reagent. In addition, dialysis of a solution of a polymer formed in the presence of a nitrogen containing methylol reagent shows that only 0.06% of nitrogen is contained in the high molecular weight polymer which does not pass through the dialysis membrane. Thus the methylol reagents do not increase the molecular weights of the polymers by grafting onto the polymer chains. Likewise, the methylol reagents do not form crosslinks between the polymer molecules, as seen by the fact that the polymer solutions behave as true solutions and not gels unless the methylol reagent itself gels under similar conditions of concentration and acidity in the absence of the polymer. The observations above indicate that the methylol reagents in some way alter the course of the free radical polymerization reaction in such a way as to increase the molecular weight of the resulting acidic polymers. On the other hand, methylol reagents or formaldehyde are not known to enter into free radical reactions or polymerization reactions in any way which would increase the molecular weight of the polymers, although there are many reactions which would be proposed whereby methylol reagents or formaldehyde would greatly decrease the molecular weight of the polymers of this invention.

The cause of the unexpected phenomenon of this invention is unknown, but it may be speculated that the methylol reagents and/or formaldehyde from the reagents in some way inhibit the termination step of the polymerization reaction, thus allowing the polymer chains to grow much larger during the course of the reaction.

Another possible, but implausible, explanation could be slowing of the initiation step of the free radical polymerization reaction, thus causing the polymer to be formed from only a small number of free radicals. This explanation is implausible because the rate of the polymerization is not greatly decreased by the addition of the methylol reagent, and large amounts of catalysts, both in the presence and the absence of methylol reagents, do not radically decrease the viscosity of the polymer solutions under those formed with smaller amounts of catalysts.

DESCRIPTION OF THE INVENTION

The practice of this invention consists of performing a free radical polymerization of an acidic monomer in an aqueous solution which also contains a methylol amide or formaldehyde. The water solvent in the reaction has two functions: to provide intimate contact among the reacting species and to provide a thermal mass to disperse the large amount of heat given off by the exothermic polymerization reaction.

In general, the polymerization process of this invention is carried out in accordance with the usual practices of solution polymerization reactions. Thus, it is preferred, but not necessary, to use deaerated water as a solvent for the reaction and to take normal precautions to exclude large amounts of air from the reaction. These precautions help to reduce the induction period of the reaction but are not necessary for the success of the reaction, since the amount of initiating catalyst used in the process of this invention is enough to insure success of the reaction despite the presence of atmospheric oxygen. In addition, it is not necessary to remove inhibitors from the monomer if enough initiating catalyst is used to overcome the inhibitor.

Other conditions in carrying out the reaction are not critical. The temperature at which the polymerization is performed is not critical but it is generally necessary to provide some means of controlling the temperature of the reaction when it is carried out in amounts greater than a few hundred grams of solution because of the exothermic nature of free radical polymerization reactions. Thus, when reactions of this invention are carried out on a moderate or large scale, provision must be made for removal of the heat of reaction in order to maintain the temperature in the preferred range of 20°C to 100°C. With small-scale reactions, of course, such temperature control is not necessary since heat dissipation from small volumes is efficient enough to maintain the temperature near the ambient room temperature.

It is also desirable, but not necessary to maintain stirring during the period of the polymerization reaction. Stirring is usually necessary in large-scale reactions as part of the heat dissipation mechanism and is desirable in large-scale or small-scale reactions to maintain homogeneity of the product by preventing excessive increases in viscosity of the solution in localized parts of the reaction vessel.

The order of addition of the reagents is important to the success of the polymerization reaction. In general, the acidic monomer is added first to a quantity of water, then the methylol amide reagent or formaldehyde and more water are added and finally the initiating catalyst or catalysts which have been dissolved in sufficient water to make up the final desired volume of the reaction solution. The acidic monomer is diluted with water before the methylol reagent is added in order to avoid possible condensation or decomposition reactions of the methylol reagent caused by mixture with a high concentration of acid. The initiating catalyst is added last, and causes the polymerization reaction to begin, either immediately or after an induction period of up to several hours. It is preferred that the initiating catalyst be added to the reaction mixture in water solution in order to obtain a homogeneous reaction solution, and avoid inhomogeneities consisting of very highly viscous portions and fluid portions containing unreacted materials. If the initiating catalyst consists of a combination of reagents, such as, for example, an oxidizing reagent and a reducing reagent, it is preferred that they be dissolved separately and added separately to the polymerization reaction solution.

The acidic monomers of this invention are water-soluble organic compounds containing an acidic group and an unsaturated group capable of undergoing a free radical polymerization reaction. The preferred acidic monomers of this invention are acrylic acid and methacrylic acid. Other monomers which can be used in the practice of this invention include vinyl acetic acid, allyl acetic acid, crotonic acid, citraconic acid, itaconic acid, fumaric acid, maleic acid, and the like carboxylic acids; vinyl sulfonic acid, vinyl hydrogen sulfate, allyl sulfonic acid, styrene sulfinic acid, and the like sulfonic or sulfuric acids; allyl phosphonic acid, vinyl hydrogen phosphate, and the like phosphonic acids; and combinations of these acidic monomers. In addition combinations of these acidic monomers with up to 50% of neutral, water soluble monomers may be used in the practice of this invention. Such neutral water soluble monomers include acrylamide, methacrylamide, methyl acrylate, methyl methacrylate, ethyl acrylate, allyl alcohol, hydroxyethyl methacrylate, vinyl pyrrolidinone, acrylonitrile, and the like. Since the novel effect of this invention is not observed in the polymerization of neutral monomers, the use of large ratios of neutral to acidic monomers results in only small improvements in the viscosity of the polymer solutions caused by the use of the methylolamide reagents of this invention.

The concentration of the monomer in the reaction solutions of this invention is not critical but can be from about 1% to about 50% of the weight of the total solution. The preferred range of concentrations is from about 4% to about 12%. Lower concentrations of the acidic monomers in the reaction solution give only moderately enhanced solution viscosities, so that there is no advantage in using the methylol amide reagents in the polymerization of dilute solutions of acidic monomers. On the other hand, when very concentrated solutions of the acidic monomers with the methylol reagents are polymerized, the reaction is highly exothermic and the resulting solutions have extremely high viscosities and are therefore difficult to dilute to useable concentrations.

The methylol reagents used in the practice of this invention are N-methylol amides having one or more hydroxymethyl groups attached to amide nitrogen atoms. Formaldehyde may also be used as the methylol reagent in the practice of this invention. These reagents are among those commonly used for crosslinking cellulosic textiles. The preferred reagents for this use are 1,3-bis(hydroxymethyl)-4,5-dihydroxy-2-imidazolidinone (dimethyloldihydroxyethyleneurea), formaldehyde, methyl N,N-bis(hydroxymethyl)carbamate (dimethylol methyl carbamate) and other methylol carbamate esters, 1,3-bis(hydroxymethyl)-5-ethyl-2-triazone (dimethylol ethyl triazone) and other dimethylol triazones, and 1,3-bis(hydroxymethyl)-2-imidazolidinone (dimethylolethyleneurea). Other methylol amide reagents, such as methylolated melamines and urea-formaldehyde reagents, are not as suitable for the practice of this invention because the acidic reaction medium causes them to coagulate and results in a mixture of lumps of insoluble melamine-formaldehyde resin or urea-formaldehyde resin suspended in the viscous solution of the polymeric acid.

The concentrations of the methylol amide reagent (or formaldehyde) in the polymerization solution is not critical to the success of the reaction but does influence the viscosity of the polymer solutions produced by this invention. The preferred ratios of methylol reagent to acidic monomer are from 0.3 to 2.0, but other ratios can be used, depending on the concentration of the monomer and the desired properties of the polymer solution.

The initiating catalyst used in the practice of this invention may be any catalyst or combination of catalysts which generates free radicals in aqueous solutions and is used to initiate free radical polymerization reactions. The preferred concentration of the initiating catalyst (or each component of a combination catalyst) is 4%, based on the weight of the monomer. Higher catalyst to monomer ratios, up to 12% can be used, this causes a lower viscosity of the polymer solution because of the well-known fact that high catalyst to monomer ratios in polymerization reactions cause lower molecular weights in the resulting polymer. However, even when very high catalyst to monomer ratios are used, the novel effect of this invention still is seen if the viscosities of solutions polymerized in the presence and absence of methylol reagents are compared. Lower catalyst to monomer ratios may also be used, but this would cause longer induction periods for the reaction and/or necessitate exclusion of oxygen from the reaction and removal of inhibitors from the monomer and thus not take advantage of the novel aspect of this invention that such precautions are not necessary to obtain extremely high molecular weight acidic polymers. The preferred catalyst for the practice of this invention is a combination of potassium persulfate and potassium metabisulfite, added in the order listed.

Other initiating catalysts which can be used in the practice of this invention include water-soluble peroxy compounds. Examples of such compounds include potassium, sodium, and ammonium persulfates, hydrogen peroxide, sodium perborate, and tert-butyl hydroperoxide. These peroxy compounds may be used as the only catalyst in the practice of this invention, in which case it is generally necessary to conduct the reaction at an elevated temperature in order to cause the formation of free radicals. It is preferred practice of this invention to use a peroxy catalyst in combination with the reducing co-catalyst. Examples of reducing reagents which may be used in this application include potassium and sodium bisulfite, sodium thiosulfate, ferrous sulfate and other ferrous salts, glucose, potassium thiocyanate, ammonium hydroxide and various water-soluble primary, secondary, and tertiary amines. The reducing reagents are used in amounts approximately equivalent to that of the peroxy catalyst.

The following list of examples is presented to illustrate this invention and is not meant to limit its scope in any manner whatever. All concentrations are given as percentage by weight, and all viscosities are measured by the Gardner Method (ASTM Specification D154-28).

EXAMPLE 1

To a solution of 36 g of acrylic acid and 100 g of water was added 53 grams of a 45% solution of dimethyloldihydroxyethyleneurea, 15 grams of a 10% potassium metabisulfite solution, and sufficient water to make a total weight of 270 grams. The polymerization reaction was initiated by adding 30 grams of a 5% solution of potassium persulfate to the above solution. After an induction period of 45 minutes, the temperature of the solution increased to 50°C and the solution became very viscous. The concentrations of this solution were 12% in acrylic polymer, 8% in dimethyloldihydroxyethyleneurea, and 1% in sodium bisulfate. A portion of this solution was diluted with twice its volume of water to give a solution containing 4% of polyacrylic acid. The viscosity of this solution was 250 centipoises. A portion of the original polyacrylic acid solution was neutralized to pH 9 with sodium hydroxide and diluted with water to give a solution containing 2.6% of sodium salt of the polymer. This solution has a viscosity of 1860 centipoises.

EXAMPLE 2

A series of commercially available polyacrylic acids of known molecular weights was used to make a series of calibration solutions for the viscometric measurements. These solutions also contained the same concentrations of dimethyloldihydroxyethyleneurea and polymer as the solutions of Example 1. The calibration solutions were diluted and neutralized as in Example 1 and the viscosities were measured and used to construct calibration curves for the viscosity measurements. Use of this calibration chart showed that the polyacrylic acid of Example 1 had a molecular weight of approximately 16,000,000, substantially higher than that of any of the standards.

EXAMPLE 3

A portion of the 12% polymer solution of Example 1 was dialyzed against distilled water for 2 days, then lyophilized and analyzed for nitrogen. The nitrogen content of the isolated polymer was 0.06%. This example shows that the methylol reagent does not become incorporated into the polymer of Example 1 by covalent bonding, even though it influences the course of the polymerization and the properties of the product.

EXAMPLE 4

A portion of the original polymer solution of Example 1 was formed into a film and allowed to dry for 3 days in the open at room temperature. The resulting 0.013 inch film was clear and flexible, and did not change on further exposure to the atmosphere. This film could be stretched repeatedly to 400% of its original length, after which it recovered to its original dimension. This film resisted swelling and dissolution when immersed in water, toluene, chloroform, ethyl acetate, or acetone for periods of at least 3 days, but it did slowly swell, then dissolve in aqueous alkali after about one hour.

A portion of the 12% polymer solution of Example 1 was used to cast a 0.010 inch film on a glass plate. The plate and film were dried and cured at 160°C for 15 minutes. When the plate was immersed in water the film came free as a tough, flexible, clear film which became somewhat brittle on drying. When this film was immersed in a 5% sodium hydroxide solution, the film remained intact, but highly swollen and weak, for at least 30 minutes. A film similarly cast and cured from a solution of 12% polyacrylic acid dissolved immediately when it was immersed in water. A film similarly cast and cured from a solution of 12% polyacrylic acid to which 8% dimethyloldihydroxyethyleneurea had been added after the polymer was formed did not dissolve in water but came free as a weak and brittle film which dissolved immediately in 5% sodium hydroxide solution. This example shows that the polymer formed by the process of Example 1 can be formed into tough, solution-resistant films, while polyacrylic acid formed by conventional processes cannot form such films, even if dimethyloldihydroxyethyleneurea is added to the polymer before the film forming process.

EXAMPLE 5

The process of Example 1 was followed with the exception that the dimethyloldihydroxyethyleneurea was not added to the solution until after the polymerization reaction was complete. When a portion of this solution was diluted to a 4% polyacrylic acid content, it had a viscosity of 27 centipoises. When another portion of this solution was neutralized and diluted to a 2.6% sodium polyacrylate content, it had a viscosity of 41 centipoises. These viscosities correspond to a molecular weight of 90,000 on the calibration chart of Example 2. This Example shows that the methylol reagent must be present during the polymerization reaction for the novel effect of this invention to occur.

EXAMPLE 6

The procedure of Example 1 was followed with the exception that only 12 grams of acrylic acid was used instead of 36 grams as in Example 1. The resulting solution has a 4% concentration of polymer and a viscosity of 50 centipoises. A portion of this solution was neutralized to pH 9 and diluted to 2.6% polymer concentration. This solution had a viscosity of 153 centipoises. These vicosities correspond to a molecular weight of 570,000 on the calibration chart of Example 2. This Example shows that the novel effect of this invention of increasing the molecular weight of the polymer by the use of the methylol reagent occurs even when low concentrations of monomer or high ratios of initiator to monomer are used.

EXAMPLE 7

The procedure of Example 1 was carried out with the exception that 57 grams of a 42% solution of dimethylolethyltriazone were used in place of the dimethyloldihydroxyethyleneurea solution. A portion of this solution was diluted to contain 4% of polymer. The viscosity of this solution was 129 centipoises. Another portion of the solution was neutralized to pH 9 and diluted to contain 2.6% of polymer. The viscosity of this solution was 1180 centipoises. These centipoises correspond to a molecular weight of 6,200,000 on the calibration chart of Example 2.

EXAMPLE 8

The procedure of Example 1 was followed with the exception that 30 grams of an 80% solution of dimethylolmethylcarbamate was used in place of the dimethyloldihydroxyethyleneurea solution. A portion of the solution was diluted to contain 4% of polymer. The viscosity of this diluted solution was 500 centipoises. Another portion of the solution was neutralized to pH 9 and diluted to contain 2.6% of polymer. The viscosity of this neutralized solution was 3384 centipoises. These viscosities correspond to 9 molecular weight of 42,000,000 on the calibration chart of Example 2.

EXAMPLE 9

The procedure of Example 1 was followed with the exception that 32 grams of a 37% solution of formaldehyde was used in place of the dimethyloldihydroxyethyleneurea solution. The reaction solution thus contained 4% by weight of formaldehyde or 33% of formaldehyde based on the weight of the acrylic acid. After the reaction was complete, a portion of the solution was diluted to contain 4% of polymer.

The viscosity of this diluted solution was 1180 centipoises. Another portion of the reaction solution was neutralized to pH 9 and diluted to contain 2.6% of polymer. The viscosity of this neutralized solution was 19,100 centipoises. These viscosities correspond to a molecular weight of 370,000,000 on the calibration chart of Example 2. A portion of the original polymer solution of this Example was formed into a film and dried for 4 days in the open atmosphere. The resulting clear, tough film has properties similar to the film of Example 4. This Example and Examples 1, 7 and 8 show the use of formaldehyde and various methylol amide reagents which do not coagulate on standing in acidic solutions. When other methylol amide reagents were used in the process of Example 1, a viscous solution containing particles of coagulated insoluble formaldehyde-amide polymers is obtained.

EXAMPLE 10

The procedure of Example 1 was followed with the exception that methacrylic acid was used in place of the acrylic acid. The solution became extremely viscous during the polymerization reaction. A portion of this solution was diluted (with extensive stirring) to contain 4% of polymer. The viscosity of this solution was 50 centipoises. A portion of this solution was neutralized to pH 9 and further diluted to contain 2.6% of polymer. The viscosity of this solution was 231 centipoises. These values correspond to a molecular weight of approximately 700,000 on the calibration chart for polyacrylic acids in Example 2.

This invention has been described in detail with particular reference to preferred embodiments thereof, but it will be understood that variations and modifications can be effected within the spirit and scope of the invention as described hereinabove and defined in the appended claims.

We claim:
1. A process for forming acidic polymers of high molecular weight comprising:
   a. polymerizing a monomer system consisting essentially of at least 50% by weight of an acidic monomer selected from the group consisting of acrylic acid or methacrylic acid in a water solution containing a reagent selected from the group consisting of
dimethyloldihydroxyethyleneurea,
formaldehyde,
methyloltriazones, and
methylolcarbamates, the weight ratio of said reagent to acidic monomer being from 0.3 to 2.0, using a free radical initiating system consisting of a persulfate oxidizing agent and a bisulfite reducing agent;

b. dialyzing the solution prepared in (a); and
c. drying the dialyzed solution.

2. The product prepared by the process of claim 1.

* * * * *